(12) United States Patent
Vargantwar

(10) Patent No.: US 8,503,297 B1
(45) Date of Patent: Aug. 6, 2013

(54) ADAPTIVE RATE CONTROL BASED ON BATTERY LIFE

(75) Inventor: Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 460 days.

(21) Appl. No.: 12/880,207

(22) Filed: Sep. 13, 2010

(51) Int. Cl.
*H04L 12/26* (2006.01)

(52) U.S. Cl.
USPC ......... 370/230.1; 370/311; 370/342; 455/425

(58) Field of Classification Search
USPC .............. 370/230, 230.1, 311, 312, 328, 342, 370/343, 252, 260, 318, 329; 455/422.1, 455/423–425, 501, 63.1, 67.13, 135, 226.3, 455/277.2, 574, 67.11, 522
See application file for complete search history.

(56) References Cited

U.S. PATENT DOCUMENTS

| | | | |
|---|---|---|---|
| 7,010,329 B2 * | 3/2006 | Livet et al. | 455/423 |
| 7,120,447 B1 * | 10/2006 | Chheda et al. | 455/422.1 |
| 7,962,182 B2 * | 6/2011 | Kwan et al. | 370/260 |
| 8,194,562 B1 * | 6/2012 | Gandhi et al. | 370/252 |
| 8,265,024 B2 * | 9/2012 | Jeon | 370/329 |
| 2010/0309831 A1 * | 12/2010 | Yeh et al. | 370/311 |
| 2011/0159913 A1 * | 6/2011 | Yang et al. | 455/67.13 |
| 2011/0222455 A1 * | 9/2011 | Hou et al. | 370/311 |

* cited by examiner

*Primary Examiner* — Jeffrey M Rutkowski

(57) ABSTRACT

A method and system is disclosed for adaptive rate control based on battery life. An access terminal in a wireless communication system that includes a base station will operate in a first state in which, at least, the access terminal responds to receiving reverse-noise messages from the base station by making adjustments to a data transmission rate on a reverse-link traffic channel to the base station in accordance with the received reverse-noise messages. Upon receiving a first threshold number of reverse-noise messages from the base station indicating that the reverse-link noise measured by the base station is alternating above and below the threshold level, and in response having a battery power level below a threshold power level, the access terminal will transition to operating in a second state in which, at least, the access terminal does not make the adjustments to the data transmission rate on the reverse-link traffic channel in response to receiving reverse-noise messages from the base station.

21 Claims, 7 Drawing Sheets

ADAPTIVE RATE CONTROL BASED ON BATTERY LIFE

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector.

An access terminal may also engage in an active communication session simultaneously with multiple cells or sectors that are located geographically nearby one another, and which are all detected by the AT above one or another threshold signal strength. In this mode of operation, the AT is said to be in "soft handoff" with the multiple sectors, and may move among them seamlessly with respect to the active communication session. As the AT moves beyond the threshold range of one or another of its soft handoff sectors and into the range of one or more other sectors, usual handoff procedures are used to update the particular sectors with which the AT is in soft handoff.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0 and Rev. A, or other version thereof (hereafter "IS-856" unless otherwise specified). Access terminals operating in such systems may be capable of communication with either or both protocols, and may further be capable of handing off between them, in addition to being able to hand off between various configurations of coverage areas.

OVERVIEW

An AT receives data from a base station on a "forward link" and sends data to the base station on a "reverse link." Data on either link are encoded by the sender and decoded by the receiver. The rate at which data can be transmitted on either link depends in part on the RF conditions of the respective link as well as the power level at which the data are transmitted. Better RF conditions and/or higher transmission power (e.g., higher signal-to-noise characteristics of a link) generally supports higher data rates, and vice versa. RF conditions may include factors such as noise and interference, while transmission power level is generally specified in accordance with one or more power-control procedures that are aimed at balancing the transmission power required to accommodate a given data rate with the impact of allocating the requisite power on one or another form of power budget and/or on RF interference.

In one of the power-control procedures used in IS-856 for managing reverse-link noise and load, the base station monitors the aggregate reverse-link noise and interference resulting from the combined transmissions of active ATs in a sector or cell (or other form of coverage area), and periodically broadcasts a reverse-noise message that reflects the aggregate reverse-link noise level measured by the base station. More particularly, the base station periodically sets the reverse-noise message to a binary value (e.g., one or zero) according to whether or not the noise level measured by the base station exceeds a threshold noise level. Upon receiving the message, each AT with an active call or session in the sector may then respond by adjusting its reverse-link power. The manner in which an AT responds depends upon which of version of IS-856 the AT is operating under.

In particular, an AT operating under IS-856, Rel. 0 will respond to a reverse-noise message by making an adjustment to its reverse-link data transmission rate according to the binary value in the reverse-noise message. The process of making the adjustment invokes a probability test in order to determine if an adjustment should actually be enacted, while the direction of the adjustment (i.e., upward or downward from a current rate) depends on the binary value in the reverse-noise message. An AT operating under IS-856, Rev. A will respond to a reverse-noise message by making an adjustment to parameters that control or "tune" characteristic behavior of a reverse-link flow-control mechanism. In carrying out either procedure, the AT will consume some amount of battery power. The amount will depend at least in part on how much the reverse-link power changes to accommodate the adjustment to the reverse-link data rate, and how quickly the protocol dictates the changes should be made.

It may occur that a base station measures a reverse-link noise level that alternates above and below the threshold noise level with a periodicity of the measurements. When this happens, the base station will broadcast reverse-noise messages that alternate in binary value from one message to the next. In turn, the AT will respond by applying reverse-link rate adjustment procedures that will tend to increase and decrease the AT's reverse-link data transmission rate in an alternating fashion, in correspondence with the alternating binary values in the received reverse-noise messages. Such alternation of reverse-link data transmission rate, and consequently of reverse-link transmission power level, can accelerate consumption of AT battery power. Moreover, the alternating reverse-link transmission power from the AT will tend to reinforce the conditions that caused the base station to broadcast reverse-noise messages with alternating values in the first place, further exacerbating accelerated consumption of AT battery power. It would therefore be advantageous to be able to adapt reverse-link power-control procedures in a way that reduces or eliminates undue battery power consumption. Accordingly, embodiments of the present invention advantageously provide adaptive rate control based on battery life.

Hence in one respect, various embodiments of the present invention provide, in an access terminal operating in a wireless communication system that includes a base station, a method comprising: operating in a first state in which at least: the access terminal responds to receiving reverse-noise messages from the base station by making adjustments to a data transmission rate on a reverse-link traffic channel to the base station in accordance with the received reverse-noise messages, wherein each of the reverse-noise messages comprises an indicator of reverse-link noise measured relative to a threshold level by the base station; while operating in the first state, receiving a first threshold number of reverse-noise messages from the base station indicating that the reverse-link noise measured by the base station is alternating above and below the threshold level; and in response to both of (i) the access terminal having a battery power level below a threshold power level, and (ii) receiving the first threshold number of reverse-noise messages, transitioning to operating in a second state in which at least: the access terminal does not make the adjustments to the data transmission rate on the reverse-link traffic channel in response to receiving reverse-noise messages from the base station.

In another respect, various embodiments of the present invention provide an access terminal configured to operate in a wireless communication system that includes a base station, the access terminal comprising: means for operating in a first state in which at least: the access terminal responds to receiving reverse-noise messages from the base station by making adjustments to a data transmission rate on a reverse-link traffic channel to the base station in accordance with the received reverse-noise messages, wherein each of the reverse-noise messages comprises an indicator of reverse-link noise measured relative to a threshold level by the base station; means for operating in a second state in which at least: the access terminal does not make the adjustments to the data transmission rate on the reverse-link traffic channel in response to receiving reverse-noise messages from the base station; and means for transitioning from operating in the first state to operating in the second state in response to both of (i) having a battery power level below a threshold power level, and (ii) receiving a first threshold number of reverse-noise messages from the base station indicating that the reverse-link noise measured by the base station is alternating above and below the threshold level.

In yet another respect, various embodiments of the present invention provide a non-transitory tangible computer readable storage medium having stored thereon computer-executable instructions that, if executed by an access terminal, cause the access terminal to perform functions comprising: operating in a first state in which at least: the access terminal responds to receiving reverse-noise messages from a base station by making adjustments to a data transmission rate on a reverse-link traffic channel to the base station in accordance with the received reverse-noise messages, wherein each of the reverse-noise messages comprises an indicator of reverse-link noise measured relative to a threshold level by the base station; while operating in the first state, receiving a first threshold number of reverse-noise messages from the base station indicating that the reverse-link noise measured by the base station is alternating above and below the threshold level; and in response to both of (i) the access terminal having a battery power level below a threshold power level, and (ii) receiving the first threshold number of reverse-noise messages, transitioning to operating in a second state in which at least: the access terminal does not make the adjustments to the data transmission rate on the reverse-link traffic channel in response to receiving reverse-noise messages from the base station.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications, and is referred to herein simply as CDMA communications. IS-856 applies more exclusively to packet-data communications (including, e.g., real-time voice and data applications), and is referred to herein as "high rate" packet-data communications. Under IS-2000, packet-data communications are referred to as "1X-RTT" communications, also abbreviated as just "1X." However, since IS-2000 supports both circuit voice and packet data communications, the term 1X (or 1X-RTT) is sometimes used to more generally refer the IS-2000 air interface, without regard to the particular type of communication carried. Packet-data communications under IS-856 are conventionally referred to as "EVDO" communications, also abbreviated as just "DO." The terms EVDO, Rel. 0 and EVDO, Rev. A will be used herein to refer to IS-856, Rel. 0 and IS-856, Rev. A, respectively, and vice versa. Different versions of 1X-RTT may be similarly distinguished. Absent any specific version identification, EVDO will generally refer to any version of IS-856. It should be understood that the present invention can apply to other wireless voice and data protocols including, without limitation, IS-95 and GSM, which, together with IS-2000 and IS-856 are considered herein, individually or in any combination, to comprise a CDMA family of protocols.

Figure 1:
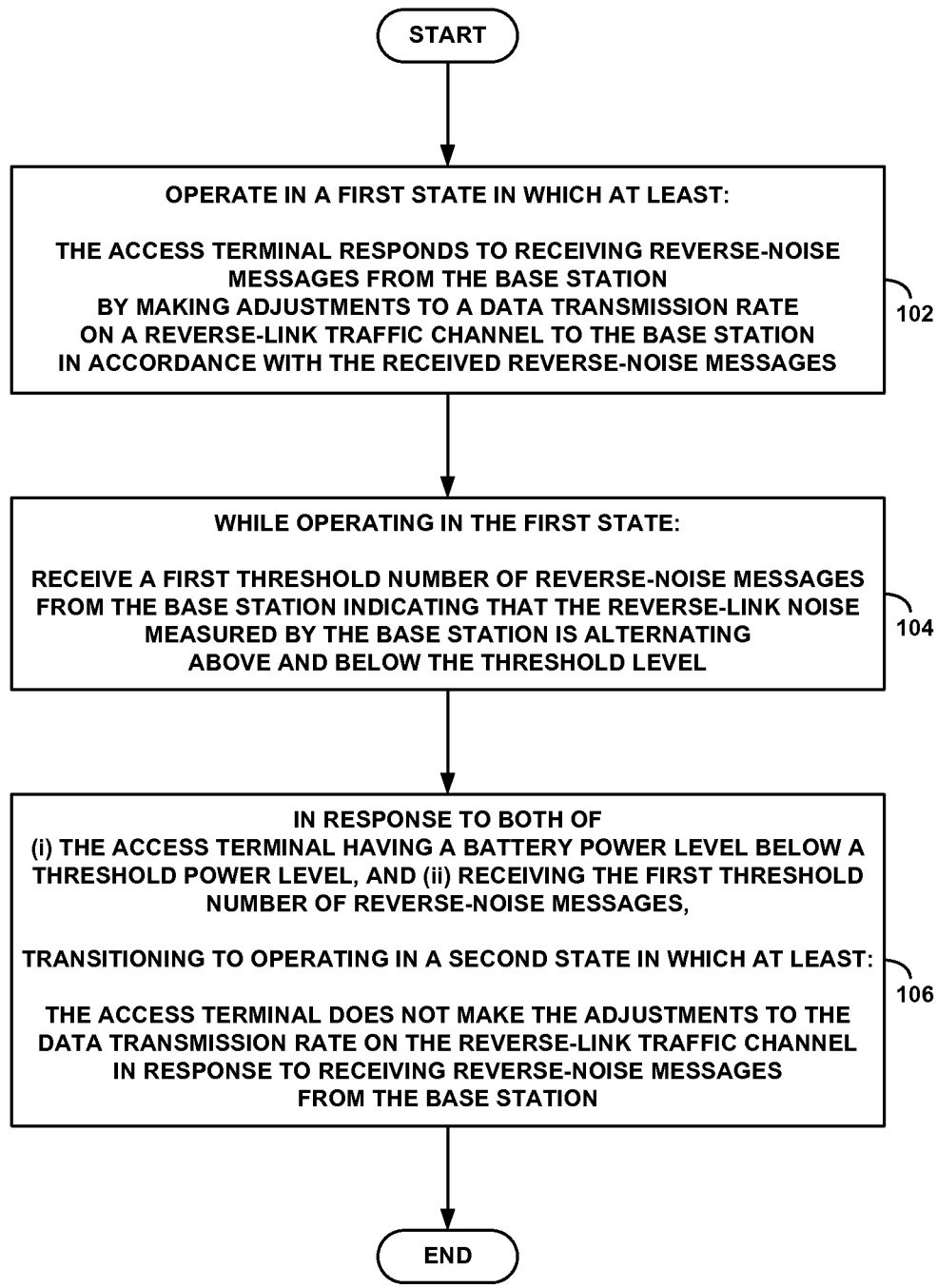
FIG. 1 is a flowchart illustrating an example embodiment of adaptive rate control based on battery life.

FIG. 1 is a flowchart illustrating an example embodiment of adaptive rate control based on battery life. By way of example, the steps of the flowchart could be implemented in an access terminal configured to operate according to a CDMA family of protocols, including IS-856 in a similarly-compliant wireless communication system that includes a base station (among other elements of a RAN). A base station typically comprises a BSC, a BTS, and a coverage area, such as a cell or a sector. The BSC may control more than one BTS, and the BTS may radiate (and receive) in more than one sector.

At step 102, the access terminal operates in a first state in which, at least, the access terminal responds to receiving reverse-noise messages from the base station by making adjustments to a data transmission rate on a reverse-link traffic channel to the base station in accordance with the received reverse-noise messages. As mentioned above and described in more detail below, each of the reverse-noise messages comprises an indicator of reverse-link noise measured relative to a threshold level by the base station.

At step 104, while operating in the first state, the access terminal receives a first threshold number of reverse-noise messages from the base station indicating that the reverse-link noise measured by the base station is alternating above and below the threshold level. In general, the access terminal will receive periodic reverse-noise messages while operating in the first state, some of which may indicate alternating measurements from one message to the next, and some of which may not. The receipt of the first threshold number of reverse-noise messages indicating alternating measurements by the base station corresponds to the occurrence of a condition, namely that not only are consecutive, alternating reverse-noise messages being received, but the first threshold number of them has been received.

At step 106, the access terminal responds to (i) the receipt of the threshold number and additionally to (ii) a condition that its battery power level is below a threshold power level by transitioning to operating in a second state in which, at least, the access terminal does not make the adjustments to the data transmission rate on the reverse-link traffic channel in response to receiving reverse-noise messages from the base station. While operating in the first state, the access terminal would conventionally respond to the alternating reverse-noise messages by adjusting its reverse-link transmission power in a corresponding, alternating fashion, thereby tending to accelerate battery consumption. The receipt of the threshold number of alternating reverse-noise messages indicates that alternating reverse-noise levels measured by the base station may be a relatively persistent condition, so that the tendency to accelerated battery consumption may also persist. This situation coupled with the condition of below-threshold battery power thus provides a trigger to the access terminal to adapt its operation so as to conserve battery power by ceasing to respond to reverse-noise messages; i.e., the access terminal is triggered to transition to operating in the second state. Thus, the access terminal advantageously avoids undue battery power consumption that would otherwise occur in the conventional operation of the first state. Taking the condition of below-threshold battery power as an indicator of relatively short remaining battery life, the adapted operation can be considered as being based on battery life.

In accordance with the example embodiment, the access terminal will be engaged in an active communication session via the base station while operating in both the first and second states. More particularly, for an access terminal operating according to IS-856 in a sector (or cell or other form of coverage area) of a similarly-compliant RAN, the access terminal will be engaged in an EVDO data session, whereby the forward-link and reverse-link communications are carried on an EVDO air interface with the sector. Under IS-856, the reverse-noise messages each comprise a reverse activity bit (RAB) broadcast by the BTS of the sector on a forward-link Reverse Activity Channel. Specifically, the RAB will be set to one of two binary values (e.g., one or zero) by the sector according to whether the aggregate reverse-link noise for the sector was above or below a threshold noise level.

In further accordance with the example embodiment, the adjustments made by the access terminal while operating in the first state will comprise adjustments to the data transmission rate on the reverse-link traffic channel made in response to each received RAB in accordance with procedures defined by IS-856. More specifically, an AT operating under IS-856, Rel. 0 will respond to each received RAB by invoking a probability test in order to determine whether or not to modify its current reverse-link data transmission rate. The probability test yields a binary outcome that can be characterized as one of "success" or "failure," whereby the AT will modify its current reverse-link data transmission rate for an outcome of "success" and will not modify its current reverse-link data transmission rate for an outcome of "failure." In particular, for an outcome of "success," the AT will increase its reverse-link data transmission rate (and correspondingly its reverse-link data transmission power) for a RAB indicating that the reverse noise measured by the sector is below the threshold noise level (typically RAB=0). Conversely, the AT will decrease its reverse-link data transmission rate (and correspondingly its reverse-link data transmission power) for a RAB indicating that the reverse noise measured by the sector is above threshold noise level (typically RAB=1), again when the outcome of the probability test is "success."

An AT operating under IS-856, Rev. A will respond to each received RAB by making an adjustment to parameters that control or tune characteristic behavior of a reverse-link flow-control mechanism. More specifically, the AT will periodically compute a filtered RAB ("FRAB") that represents a trend in RAB values over an interval long enough to average over short-term (e.g., one RAB to the next) variations. FRAB in turn serves as an input to a procedure for controlling the reverse-link transmission rate that treats reverse-link transmission power as a resource to be allocated (i.e., refreshed) and consumed (i.e., applied to transmissions).

Under IS-856, the AT's reverse link includes a pilot channel and a data traffic channel (among other channels). The AT's pilot channel carries a beacon (or pilot) signal that the base station uses for (among other purposes) maintaining a timing reference for decoding other reverse-link signals from the AT, and the AT's data traffic channel carries user data. The AT sets its pilot signal power level based on power-control commands received from the base station, and sets its reverse-link data traffic channel power relative to the pilot channel power by a multiplicative factor referred to as "traffic-to-pilot" (abbreviated "T2P"). During an active EVDO data session, the AT periodically adjusts its data traffic channel power by periodically setting its T2P value. The AT sets T2P using the resource-allocation procedure of IS-856, Rev. A, or to accommodate the reverse-link data rate determined according to IS-856, Rel. 0.

In practice, the power level of both the pilot and data traffic channels are usually specified as a gain level, x, according to the relation x dBm=10 $\log_{10}$(P/1 mW), where P is the power in mW (milliwatts). As a relative level, T2P is then expressed in dB with respect to the pilot power. For example, T2P=+3 dB would correspond to a data traffic channel power twice that of the pilot channel, and T2P=+6 dB would correspond to a data traffic channel power four times that of the pilot channel. The total power of the reverse link pilot and data traffic channels would then be the sum of the powers of the individual channels. In terms of absolute power, a pilot power of 1 Watt and T2P=+3 dB would correspond to data traffic channel power of 2 Watts and a total power of 3 Watts. Similarly, if T2P=+6 dB, the total reverse link power of the pilot plus data traffic channels would be 5 Watts in this example.

Since the sector sets each RAB value according to whether the measured reverse-link noise level is above or below the threshold level, receipt by the AT of the first threshold number of alternating reverse-noise messages from the base station (step 104) comprises receiving a number of consecutive RABs that alternate in value between the two binary values, wherein the number equals the first threshold number. In responding to received RAB broadcasts by adjusting its reverse-link data transmission rate, an AT operating under either version of IS-856 will tend to consume battery power, particularly when the received RABs alternate in value from one to the next. Under Rev. A, such alternation may tend to be smoothed over by FRAB, although alternation will still effect how the AT adjusts it reverse-link transmission power. Under IS-856, Rel. 0, the effect of alternating RAB values will tend to be more immediate, and therefore tend to have a particularly detrimental impact on battery power consumption. Accordingly, adaptive rate control based on battery life, described herein by way of example, may be especially applicable to IS-856, Rel. 0 in mitigating undue battery power consumption in the face of alternating RAB values. It will be appreciated, however, the usefulness and advantages of adaptive rate control based on battery life, as implemented in one or another embodiment, are not limited to IS-856, Rel. 0, and can also be applied advantageously to IS-856, Rev. A, among other possible reverse-link power and rate control procedures.

In accordance with the example embodiment, the particular behavior of the access terminal of not making adjustments to the reverse-link data transmission rate while operating in the second state comprises suspending the procedures defined by IS-856 for adjusting the data transmission rate on the reverse-link traffic channel for each received RAB. For example, an AT operating according to IS-856, Rel. 0 will not invoke the probability test in response to receiving any RABs while operating in the second state. Consequently, the AT will not modify its reverse-link data transmission rate while operating in the second state, but will maintain a current rate regardless of reverse-noise messages received from the base station, wherein the current rate is the rate in place when the access terminal transitions to operating in the second state.

In further accordance with the example embodiment, the condition the AT has a battery power level below the threshold power level at the time (during operation in the first state) that the AT receives the first threshold number of alternating reverse-noise messages will correspond to the AT making a determination that the battery power level is below the threshold power level. Moreover, the determination can be made prior to the access terminal operating in the first state, or while the access terminal is operating in the first state. For example, the determination could be made prior to establishment of an EVDO session. Alternatively, the battery power could drop below the threshold power level while the AT is operating in the first state.

In still further accordance with the example embodiment, the AT could transition from operating in the second state back to operating in the first state in response to receiving a second threshold number of reverse-noise messages from the base station indicating that the reverse-link noise measured by the base station is no longer alternating above and below the threshold level. For instance, an AT engaged in an active EVDO data session and operating in the second state could receive a number of consecutive RABs all having the same value, wherein the number is equal to the second threshold number. The second threshold number could be set such that it provides an indication that the sector is no longer measuring reverse-link noise that alternates above and below the threshold noise level, and that consecutively increasing or consecutively decreasing measurements are now relatively persistent. Under this condition, the AT would transition to operating in the first state. Thus, even though the AT's battery power level may still be below the threshold power level, the AT will nevertheless again respond to RAB broadcasts.

Note that the characterization of the first state of step 102 in terms of the access terminal making adjustments to a data transmission rate on a reverse-link traffic channel to the base station in accordance with the received reverse-noise messages should not be viewed as limiting the first state to only the described behavior of that state. The first state could include other behaviors as well, provided those other behaviors don't contradict or are not mutually exclusive with the explicitly-described behavior of the first state. Similarly, the characterization of the second state of step 106 in terms of the access terminal not making the adjustments to the data transmission rate on the reverse-link traffic channel in response to receiving reverse-noise messages from the base station should not be viewed as limiting the second state to only the described behavior of that state. As with the first state, the second state could include other behaviors as well, provided those other behaviors don't contradict or are not mutually exclusive with the explicitly-described behavior of the second state.

In the discussion of FIG. 1, as well as in other discussions and explanations herein, the terms "first" and "second" as applied to "states," "thresholds," and the like, are used as identifying labels, and not meant to imply any numerical ordering (although a numerical ordering is not necessarily excluded). It will also be appreciated that the steps of FIG. 1 are shown by way of example, and that additional and/or alternative steps or alternative ordering of steps could be carried out and still remain within the scope and spirit of the present invention or embodiments thereof.

Figure 2:
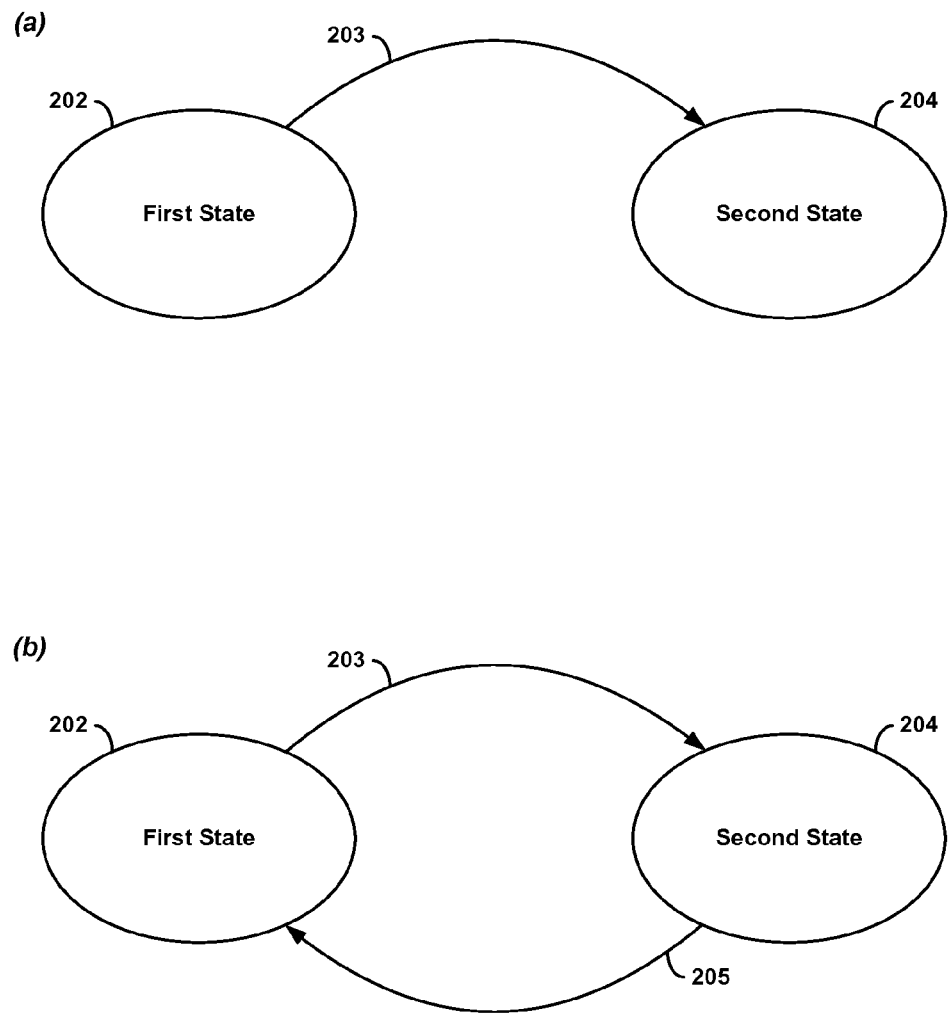
FIG. 2 is a state diagram illustrating an example embodiment of adaptive rate control based on battery life.

FIG. 2 provides a simple illustration of the first and second states and the transitions between them. In panel (a) at the top, an access terminal is operating in the first state 202, wherein operation in the first state is characterized by the description above. Responsive to receiving to both of (i) the access terminal having a battery power level below a threshold power level, and (ii) receiving the first threshold number of reverse-noise messages, the access terminal makes a transition 203 to operating in the second state 204, wherein operation in the second state is also characterized above. The transition 203 corresponds to the transition described above in connection with step 106 in FIG. 1.

The bottom panel (b) in FIG. 2 illustrates a transition 205 from the second state back to the first state. The transition 205 corresponds to the AT receiving the second threshold number of reverse-noise messages from the base station indicating that the reverse-link noise measured by the base station is no longer alternating above and below the threshold level. Following the description above, the transition 205 could be triggered by the AT receiving the second threshold number of consecutive RABs all having the same value while operating in the second state.

Figure 3:
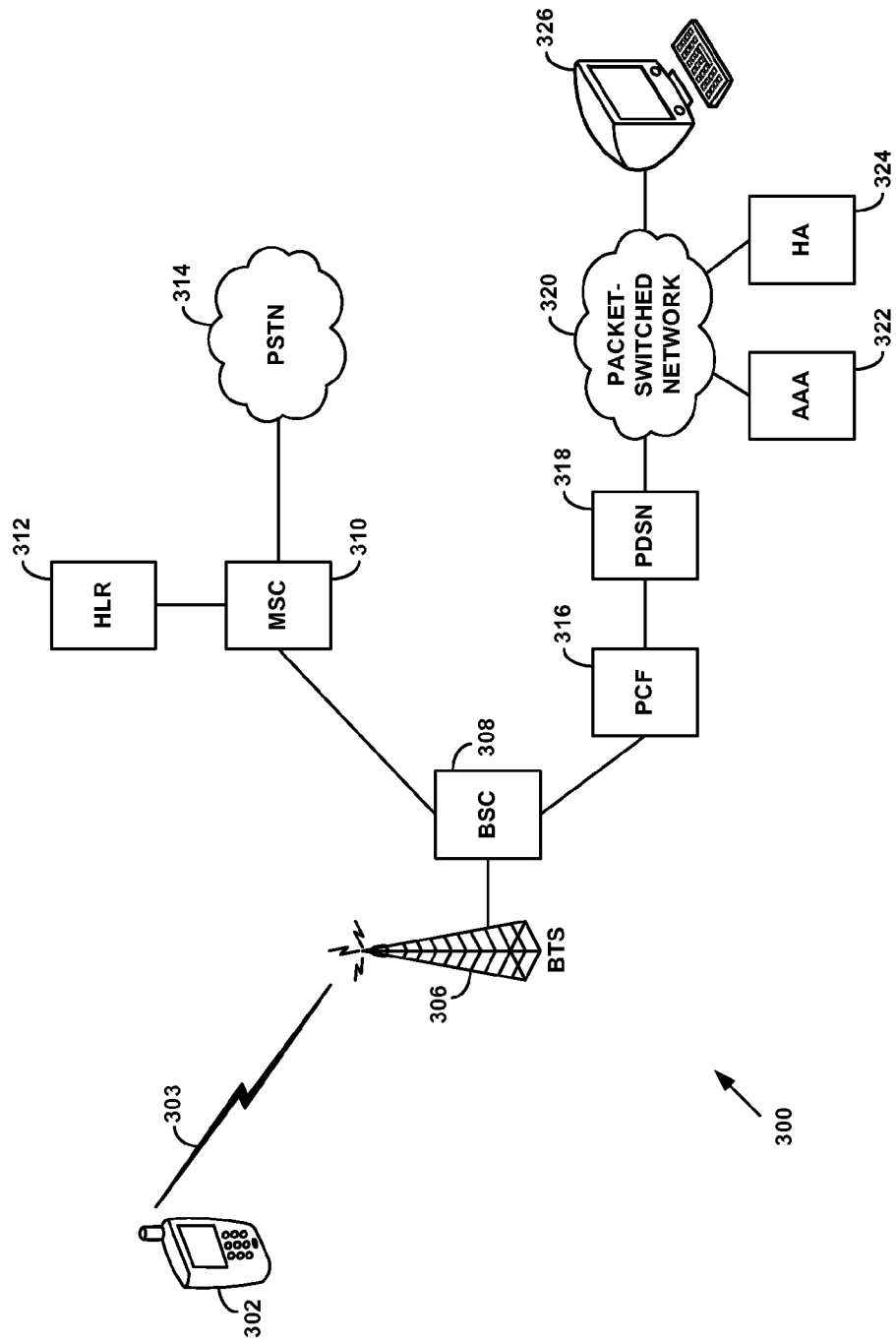
FIG. 3 is a simplified block diagram of a wireless communication system in which an example embodiment of adaptive rate control based on battery life can be employed.

FIG. 3 shows a simplified block diagram of a wireless communication system 300 in which an example embodiment of adaptive rate control based on battery life can be employed. Access terminal AT 302 communicates over an air interface 303 with a BTS 306, which is then coupled or integrated with a BSC 308. Transmissions over air interface 303 from BTS 306 to AT 302 represent the forward link to the access terminal (also referred to herein alternatively as the forward link from the base station, and as "the AT's forward link"). Transmissions over interface 303 from AT 302 to BTS 306 represent the "reverse link" (also referred to herein as "the AT's reverse link").

BSC 308 is connected to MSC 310, which acts to control assignment of air traffic channels (e.g., over air interface 303), and provides access to wireless circuit-switched services such as circuit-voice and circuit-data (e.g., modem-based packet data) service. As represented by its connection to PSTN 314, MSC 310 is also coupled with one or more other MSCs or other telephony circuit switches in the operator's (or in a different operator's) network, thereby supporting user mobility across MSC regions, and local and long-distance landline telephone services. Also connected to MSC 310 is home location register (HLR) 312, which supports mobility-related aspects of subscriber services, including dynamic tracking of subscriber registration location and verification of service privileges.

As shown, BSC 308 is also connected with a PDSN 318 by way of packet control function (PCF) 316. PDSN 318 in turn provides connectivity with a packet-switched network 320, such as the Internet and/or a wireless carrier's private core packet-network. Sitting as nodes on network 320 are, by way of example, an authentication, authorization, and accounting (AAA) server 322, a mobile-IP home agent (HA) 324, and a remote computer 326. After acquiring an air traffic channel over its air interface, an access terminal (e.g., AT 302) may send a request to PDSN 318 for a connection in the packet data network. Then, following authentication of the access terminal by AAA server 320, the access terminal may be assigned an IP address by the PDSN or by HA 324, and may thereafter engage in packet-data communications with entities such as remote computer 326.

It should be understood that the depiction of just one of each network element in FIG. 3 is illustrative, and there could be more than one of any of them, as well as other types of elements not shown. The particular arrangement shown in FIG. 3 should not be viewed as limiting with respect to the present invention. Further, the network components that make up a wireless communication system such as system 300 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network, and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminal 302 typically comprises a user-interface, I/O components, a communication interface, a tone detector, a processing unit, and data storage, all of which may be coupled together by a system bus or other mechanism. As such, system 300, AT 302, and air interface 303 collectively are representative of example means of implementing and carrying out the various functions, steps, and procedures described herein.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. Conventional CDMA Communications

In a conventional CDMA wireless network compliant with the well known IS-2000 standard, each cell employs one or more carrier frequencies, typically 1.25 MHz in bandwidth each, and each wireless service sector is distinguished from adjacent sectors by a pseudo-random number offset ("PN offset"). Further, each sector can concurrently communicate on multiple different channels, distinguished from each other by "Walsh codes." When an access terminal operates in a given sector, communications between the access terminal and the BTS of the sector are carried on a given frequency and are encoded by the sector's PN offset and a given Walsh code.

Air interface communications are divided into forward link communications, which are those passing from the base station to the access terminal, and reverse link communications, which are those passing from the access terminal to the base station. In an IS-2000 system, data are transmitted in units of frames on both the forward link and reverse link. On either link, communications in a given wireless service sector are encoded with the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

Concurrent communication in multiple forward-link channels on a common frequency in a sector is supported by allocating each channel a fraction of the total forward-link power available in the sector. The power allocated to each channel is determined so as to optimize the signal-to-noise characteristics of all the channels, and may vary with time according to the number of access terminals being serviced, and their relative positions with respect to the BTS, among other factors. Similarly, on the reverse links, each access terminal transmits at a power level that optimizes the signal-to-noise while minimizing interference with other access terminals.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other sectors, which may vary in as the AT moves about within the wireless communication system, or as other factors cause the AT's RF conditions to change. The AT reports the received signal strengths to the serving base station, which then directs the AT to update its active set in accordance with the reported strengths and one or more threshold conditions.

Operationally, an IS-2000 system is arranged to transmit the same data concurrently on a given carrier frequency in some or all of the sectors of a given AT's active set, encoding each transmission according to the PN offset of the respective sector and the Walsh code for the assigned channel therein. Correspondingly, the AT recognizes the concurrent transmissions according to the PN offsets of the sectors in its active set and the Walsh codes of its assigned channels. That is, operating under IS-2000, the AT will decode transmissions using all the PN offsets in its active set, together with the respective Walsh codes assigned for each PN-identified sector. The concurrent transmissions in sectors of the AT's active set provides an added level of reliability to communications, as well as possibly increased quality owing to improved signal to noise characteristics. The concurrency also facilitates soft handoff between sectors, as described above. A soft handoff between sectors the same BTS is referred to as a "softer handoff."

With the arrangement described above, an access terminal can engage in cellular voice and/or in packet-data communications. Referring again to FIG. 3, and taking an originating call from AT 302 as an example, AT 302 first sends an origination request over air interface 303 and via the BTS 306 and BSC 308 to MSC 310. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session (i.e., 1X-RTT), the BSC signals to the PDSN 318 by way of PCF 316. The PDSN 318 and access terminal 302 then negotiate to establish a data link layer connection, such as a point to point protocol (PPP) session. Further, the PDSN 318 sends a foreign agent advertisement that includes a challenge value to the access terminal, and the access terminal responds with a mobile-IP registration request (MIP RRQ), including a response to the challenge, which the PDSN forwards to HA 324. The HA then assigns an IP address for the access terminal to use, and the PDSN passes that IP address via the BSC to the access terminal.

2. High Rate Packet-Data Communications

Under IS-2000, the highest rate of packet-data communications theoretically available on a fundamental traffic channel of the forward link is 9.6 kbps, dependent in part on the power allocated to the forward-link traffic channel and the resultant signal-to-noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using time division multiplexing (TDM) in order to transmit to only one access terminal at a time, but at the full power of the sector. As a result of the full-power allocation by the sector, an access terminal operating under IS-856 can, in theory, receive packet-data at a rate of at least 38.4 kbps and up to 2.4 Mbps on its forward link.

TDM access on the IS-856 forward link is achieved by dividing the forward link in the time domain into time slots of length 2048 chips each. At a chip rate of 1.228 Mega-chips per second, each slot has a duration of 1.67 milliseconds (ms), or a rate of 600 time slots per second. Every 16 slots comprise a frame, corresponding to 26.67 ms per frame, and frame boundaries are synchronous across all sectors of a RAN.

Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst, for 256 MAC-channel chips per slot. The MAC channel is further subdivided into a Reverse Activity sub-channel, a "data rate control" (DRC) Lock sub-channel, an ARQ sub-channel, and a reverse power control (RPC) sub-channel. The remaining 1600 chips of each time slot (800 per half-slot) are allocated for a forward traffic channel or a forward control channel, so that any given time slot will carry either AT-specific traffic-channel data (if any exists) or AT-specific control-channel data. While the 1600 chips of forward-link traffic and/or control channel data of any given time slot are designated on a TDM basis to a specific access terminal, the MAC channel chips are encoded using different Walsh codes in order to broadcast different MAC sub-channels concurrently over the same MAC-channel chips and/or to transmit different AT-specific MAC-sub-channel data concurrently to different ATs on the same MAC-channel chips. As in IS-2000, each sector in IS-856 is defined by a PN offset, and the pilot channel carries an indication of the sector's PN offset.

The reverse link under IS-856 retains largely the traditional IS-2000 code division multiplexing (CDM) format, albeit with the addition of a "data rate control" (DRC) channel used to indicate the supportable data rate and best serving sector for the forward link. Multiple, active ATs in a common serving sector can transmit concurrently on their respective reverse links to the sector's BTS. Each reverse link comprises distinct code channels, thereby enabling the BTS to distinguish among each AT's transmissions. As with IS-2000, the IS-856 reverse link transmissions are frame-based.

The IS-856 reverse link includes an access channel and a traffic channel. The access channel is used by an AT that is not in a connected state (i.e., not in an active data session) to signal to the RAN in order to establish a data session. The traffic channel is used by an AT in a connected state to transmit data, as well as signaling and control information, to the RAN. Both the access and traffic channels include the pilot signal that serves as beacon signal for identifying the AT to the RAN and for establishing and maintaining a timing reference for decoding other signals received at the RAN from the AT. Packet-data rates achievable on the reverse-link traffic channel depend on the version of IS-856; under Rel. 0, an AT can achieve a maximum reverse-link burst rate of 153.6 kilobits per second (kbps), while under Rev. A, an AT achieve a maximum reverse-link burst rate of 1.8 Megabits per second (Mbps).

Power control of the reverse link under IS-856 employs one or more feedback procedures by which an AT adjusts its reverse-link power and data rates in response to commands from the AT's serving sector that are aimed both at maintaining a particular AT-specific reverse-link error rate within an AT-specific threshold error rate, and at maintaining an aggregate reverse-link noise level below a threshold noise level. Regarding aggregate reverse-link noise and load, each sector periodically broadcasts a RAB on its Reverse Activity subchannel, wherein the value of the RAB depends on the aggregate reverse-link noise measured by sector. An AT responds to each RAB received from each of its active-set sectors by adjusting the transmission power and/or transmission rates of its reverse data channel according to procedures compliant with one or another of Rel. 0 and Rev. A versions of IS-856. In particular, the AT adjusts its data channel transmission power and transmission rate relative to its pilot power level based on the RAB received from the sector and on the particular protocol version.

More specifically, the sector continually measures an aggregate of reverse link transmission power and every 1.67 ms (i.e., every time slot) computes a noise metric referred to as reverse noise rise (RNR). RNR is the difference between (i) the reverse noise that the sector is currently detecting and (ii) a baseline level of reverse noise. Thus, the sector computes how far the reverse noise has risen above that baseline. When the computed RNR exceeds a threshold RNR value, the sector sets the RAB to one; when the computed RNR does not exceed the threshold RNR value, the sector sets the RAB to zero. The RNR threshold is a configurable system parameter that can range from 0 dB to 30 dB. Hence, a RAB set to one corresponds to higher reverse-link noise (and less favorable RF conditions), while a RAB set to zero corresponds to lower reverse-link noise (and more favorable RF conditions).

The sector periodically broadcasts the RAB to served access terminals on its Reverse Activity sub-channel at a rate typically in multiples of once per frame, up to a maximum of 16 times per frame, corresponding to once per time slot. Each RAB value is broadcast over an integer number of consecutive time slots of a frame, after which a new RAB (possibly with the same value as the previous RAB) is broadcast over the same integer number of slots. The integer number is set in a parameter conventionally referred to as "RABlength." An AT with an active EVDO data session will, in turn, adjust its data channel power level and transmission rate according to the RABs received over each RABlength number of time slots.

Under IS-856, Rel. 0, an AT can transmit on its reverse link at one of five rates: 9.6 kbps, 19.2 kbps, 38.4 kbps, 76.8 kbps, and 153.6 kbps. The consecutive order of the listed rates defines the order in which the AT may transition between rates. At the start of a data session, the AT transmits at 9.6 kbps, then over the course of the session transitions among the other rates based on received RABs and a transition probability integer for each transition. Specifically, the AT will transition up or down from its current rate to the next consecutive higher or lower rate depending on the value (one or zero) of the RAB and based on a probability test that controls whether or not to make the transition. For a RAB set to one, the AT will transition from its current rate to the next lower rate with a probability determined by the outcome of a test for the particular downward transition. Conversely, for a RAB set to zero, the AT will transition from its current rate to the next higher rate with a probability determined by the outcome of a test for the particular upward transition. When the RAB of any one of the AT's active-set sectors is one, the AT treats the RAB of all of its active-set sectors as being set to one.

Each probability test is a uniform random selection of an integer between 0 and 255. If the selected integer is smaller than a transition probability integer (also in the range between 0 and 255) for the particular current-to-new rate pair, the AT transitions up or down to the next rate. If the selected integer is not smaller than the transition probability integer, the AT remains at its current rate. The AT then sets its reverse-link data channel transmission power to accommodate the selected rate. If a given increased data rate requires a higher transmission power than the AT is allowed at a particular time, the AT will not make the upward transition.

Under IS-856, Rev. A, an AT computes a short-term and a long-term historical indicator of RAB values reported by the base station in order to adjust a flow-control mechanism on its reverse-link. Both indicators are computed as mathematical digital filters, but differ in the time ranges over which the filters are applied. The short-term filter, referred to as "Quick" RAB (QRAB), gives a snapshot of the current state of the RAB, while the long-term filter, FRAB (discussed briefly above), yields a time-averaged value of RABs received over a much longer time interval that precedes the moment at which FRAB is computed. In practice, each RAB broadcast is modulated by the sector to a value of either −1 for RAB=0 or +1 for RAB=1.

Correspondingly, the AT computes the QRAB as either −1 or +1, and computes FRAB as a real number in the range [−1, +1]. The AT uses both QRAB and FRAB to adjust its reverse-link data channel transmission power according to a ratio of reverse traffic channel power to reverse pilot channel power, i.e., the AT adjusts T2P.

Briefly, Rev. A reverse power control treats T2P like a resource, and invokes a mechanism for resource allocation and management that is sometimes referred as a "token bucket." An amount "BucketLevel" of T2P resource in the bucket at any time is a function of an amount "T2PInflow" of T2P resource the AT adds to the bucket and an amount "T2POutflow" the AT removes from the bucket during data transmission. The AT periodically determines whether to increase or decrease T2PInflow according to whether the current value of QRAB is −1 or +1, respectively. The amount of increase (when QRAB=−1) is then determined based in part on the current value of FRAB, wherein the smaller the value of FRAB the larger the increase, and vice versa. Other factors, such as forward-link pilot strength, are used in determining the increase as well.

From the T2P inflow and current BucketLevel, the AT determines an amount of T2P resource that can be used at a given time during a transmission. The AT then sets a packet size and a transmission power level based on the amount of T2P resource that can be used. Note that this amount can sometimes momentarily exceed the inflow rate, and thereby occasionally accommodate high rate data bursts. Also, since the frame size is generally fixed, packet size corresponds to a data density and therefore a data rate; i.e., a larger packet size corresponds to a higher data rate, and vice versa. Under IS-856, Rev. A, effective reverse-link data rates can range from 19.2 kbps up to 1.84 megabits per second (Mbps).

Operation in an IS-856 compliant communication system may be illustrated, again with reference to FIG. 3. To acquire packet data connectivity under IS-856, after an access terminal first detects an EVDO carrier, the access terminal sends to its BSC (or RNC) 308 a UATI (Universal Access Terminal Identifier) request, and receives in response an UATI, which the access terminal can then use to identify itself in subsequent communications with the BSC. The access terminal then sends a connection-request to the BSC 308, and the BSC responsively invokes a process to authenticate the access terminal and to have the access terminal acquire a data link.

In particular, the BSC 308 sends an access request to an Access Network AAA (ANAAA) server (which may be different than the AAA server 322), and the ANAAA server authenticates the access terminal. The BSC 308 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 318 (via PCF 316), and the PDSN and access terminal then negotiate to establish a PPP data link. In addition, as in the IS-2000 process, the access terminal then sends an MIP RRQ to the PDSN, which the PDSN forwards to the HA 324, and the HA assigns a mobile-IP address for the access terminal to use.

3. Dynamic Adaptation of Reverse-Link Rate Control Based on Battery Life a. Operating Principles

Under IS-856, the reverse power-control procedures are based on one form or another of RAB monitoring by the AT. Since the RAB is an indicator of aggregate reverse-link noise (i.e., RNR), the reverse power-control procedures can be understood as helping to balance the reverse power and data rates achievable by the AT with the AT's contribution to the aggregate reverse-link noise and overall load from all ATs served by a given sector. In other words, reverse power-control procedures comprise a feedback mechanism, with the RAB acting as a feedback variable.

As described above, a sector determines the value for each RAB broadcast by comparing RNR to a threshold value. For each threshold comparison, the sector broadcasts a RAB value (0 or 1, modulated to −1 or +1) over RABlength consecutive time slots. For example, for RABlength=4, the sector would broadcast a given RAB over four time slots, and would generate four distinct RAB broadcasts per 16-slot frame (each RAB being independently determined as 0 or 1). The AT will interpret the RAB value beginning each RABlength slots as a new value, and in conventional operation will respond according to one or the other version of IS-856, depending on which version the AT is operating under. By way of example, and without loss of generality, the AT will be taken to be operating under IS-856, Rel. 0, since the AT's response to RABs tends to have a relatively immediate impact on its reverse-link transmission power in this case. However, as noted above, the example embodiments described herein are not limited to IS-856, Rel. 0, and could be easily adapted to IS-856, Rev. A as well. Furthermore, one of ordinary skill in the art would understand how to do so.

Figure 4:
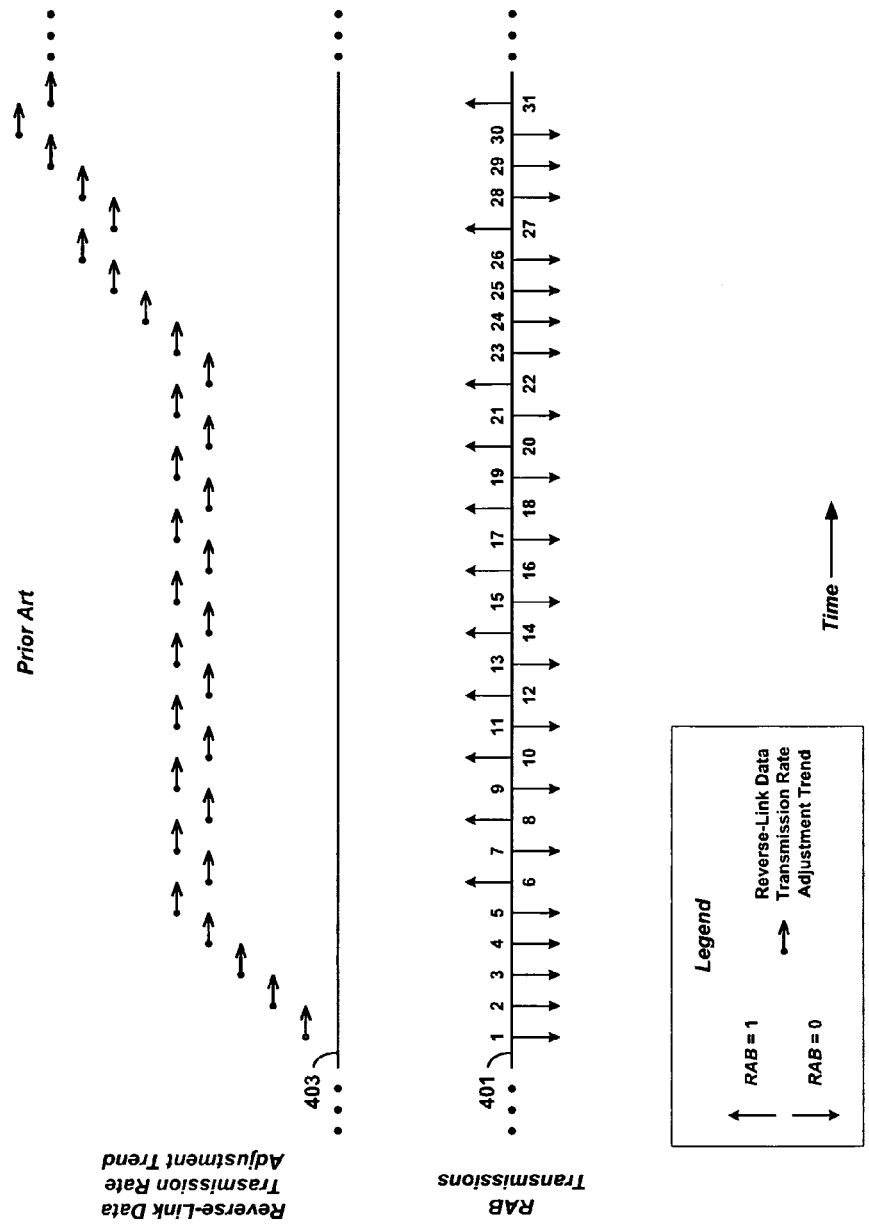
FIG. 4 illustrates conventional operation of reverse-link data rate control.

FIG. 4 illustrates conventional operation an access terminal in response to received RABs from a sector in which the access terminal has an active EVDO session. The bottom panel shows a timeline 401 of RAB broadcasts from the sector; time increases toward the right, as indicated. Downward arrows represent RAB values of zero (modulated to −1) and upward arrows represent RAB values of one (modulated to +1). Each RAB broadcast is numbered for convenience of the present discussion; the particular sequence is arbitrary, serving to illustrate the present example of operation. The top panel shows the response of the AT to each received RAB. Each response is depicted as a horizontal arrow pointing toward increasing time, and with a dot at the left end that lines up with the time of the RAB with which the response is associated; the length of each arrow corresponds to the period between received RABs. The vertical spacing between the horizontal arrows signifies an increase or decrease in reverse-link data transmission rate from one to the next; the vertical scale is arbitrary, again serving just to illustrate the present example of operation. A legend in the figure summarizes the symbols as just described.

Note that the responses are labeled "Reverse-Link Data Transmission Rate Adjustment Trend." The term "trend" is used since the AT's conventional response to a received RAB under IS-856, Rel. 0 does not guarantee an modification to the reverse-link data transmission rate, but rather only a probability of a modification. However, if the probability test yields success, the adjustment will be in a direction determined by the RAB value. For example, RAB #5 is zero (modulated to −1), so the AT will increase its reverse-link data transmission rate if the probability test yields success. Conversely, RAB #6 is one (modulated to +1), so the AT will decrease its reverse-link data transmission rate if the probability test yields success. Hence the term "trend" in the figure signifies how the AT will modify its reverse-link data transmission rate if the probability test yields success. As similar use of "trend" would apply to IS-856, Rev. A as well.

As illustrated, RABs #1-5 are equal to zero (modulated to −1). Accordingly, the AT tends to increase the reverse-link data transmission rate in response to each of these RABs, as indicated by the upward adjustment trend above timeline 403. Beginning at RAB #6 and continuing through RAB #22, the RAB values alternate between zero and one, with RAB=1 (modulated to +1) for even numbered RABs and RAB=0 (modulated to −1) for odd numbered RABs. Evidently, the sector is measuring RNR that alternates above and below a threshold level. For instance the level could be 5 dB, although other values are possible as well. When the RNR alternates above and below the threshold in this way, the RNR is said to be "ping-ponging," and the sector is said to be in a "ping-pong" condition with respect to RNR. Evidently, alternation of RNR ceases beginning with RAB #23, wherein by way of example, RABs #23-26 and #28-30 correspond to values of zero, while RABs #27 and #31 correspond to values of one.

It will be appreciated the RAB setting applied for any given measurement that exactly equals the threshold value could be determined according to an engineering design decision. For instance, RAB=1 for RNR greater than or equal to the threshold, RAB=0 for RNR strictly less than the threshold; or RAB=0 for RNR less than or equal to the threshold, RAB=1 for RNR strictly greater than the threshold.

The AT's conventional response is an alternating trend of decreasing the reverse-link data transmission rate in response to each odd numbered RAB and increasing the reverse-link data transmission rate in response to each even numbered RAB. Such alternation can have the detrimental effect of accelerating consumption of the AT's battery power. The impact of accelerated battery-power consumption can be particularly problematic when the AT's battery power is already relatively low, as indicate by one or another threshold condition, for example. Accordingly, embodiments of the present invention provide methods and means of AT operation that mitigates or eliminates undue battery consumption.

b. Example Operation

Figure 5:
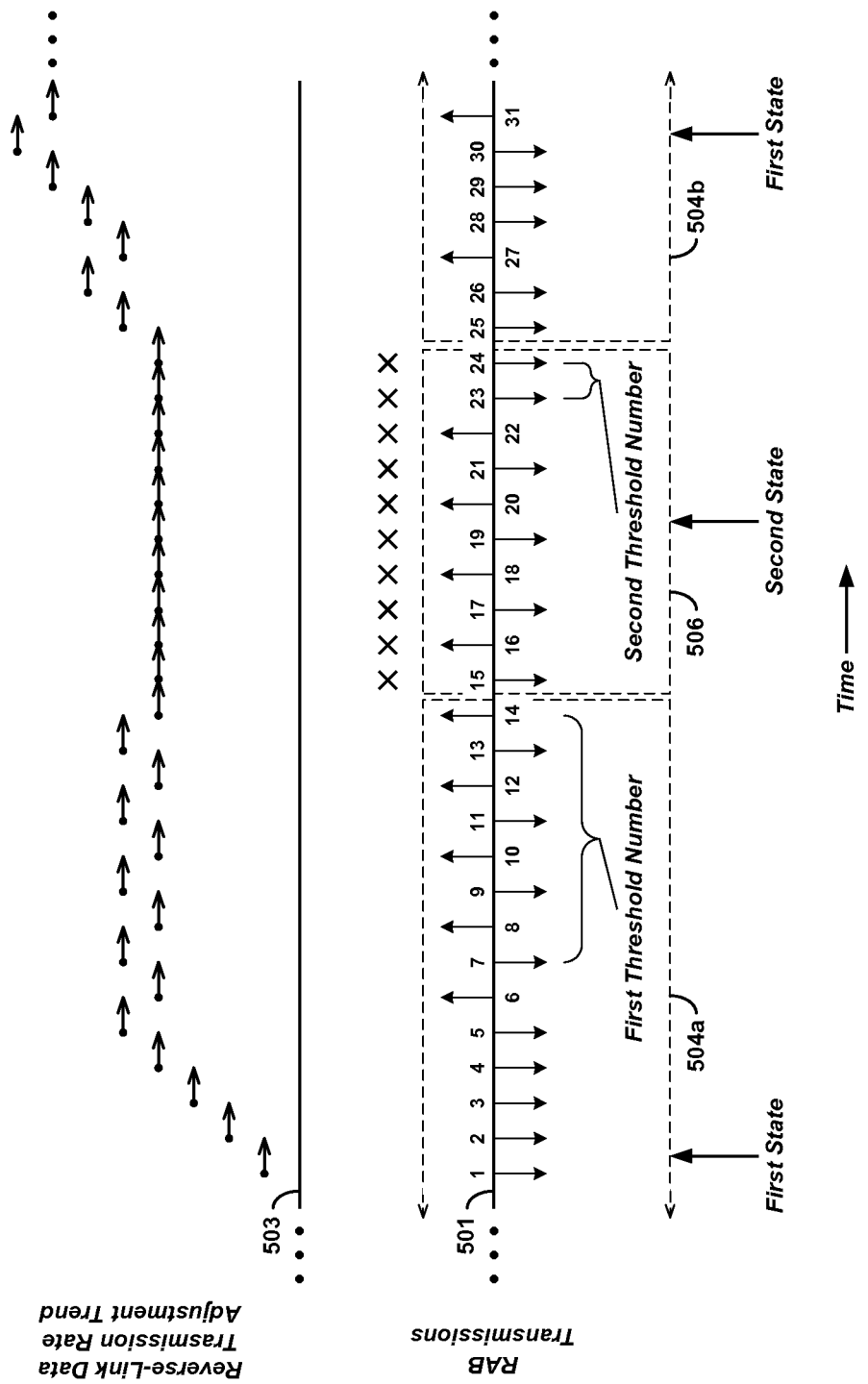
FIG. 5 illustrates operation of reverse-link data rate control according to an example embodiment of adaptive rate control based on battery life.

FIG. 5 illustrates operation of an access terminal accordance with the example embodiment of adaptive rate control based on battery life. The format and the meaning of the symbols shown in FIG. 5 are the same as those used in FIG. 4, except that the RAB broadcasts are reference to timeline 501 and the AT responses are referenced to timeline 503. The legend has been omitted from FIG. 5 for the sake of brevity. For purposes of illustrating operation according to the example embodiment, it will be assumed that the AT in FIG. 5 is operating with a battery power that is below a threshold level, and that the AT has determined the existence of this condition. That is, it is assumed that the condition of low battery power (as defined by the threshold level) is already met.

The sequence of RABs illustrated in FIG. 5 are the same as those shown in FIG. 4, however the behavior of the access terminal, now in accordance with the example embodiment, is different. The AT is initially operating in the first state 504a, represented by the open-ended dashed rectangle (the open side at the left side indicates that the state may have persisted prior to the initial time in FIG. 5). As discussed above, the AT responds conventionally to RABs while operating in the first state. Thus, the adjustment trends corresponding to RABs #1-14 in FIG. 5 illustrate the same response as those shown in FIG. 4. However, the AT tracks RABs in order to determine if and when a first threshold number of alternating RABs is received. By way of example, the first threshold number is taken to be eight. In the present example, the AT determines that it has indeed received eight alternating RABs, namely those beginning with RAB #7 and extending through RAB #14.

In accordance with the example embodiment, the AT will respond to (i) receiving the threshold number of alternating RAB values, and (ii) to the condition of its battery power level being below the threshold level, by transitioning to operating in the second state 506 (represented by the next rightward dashed rectangle) between RABs #14 and #15. As discussed above, the AT suspends responding to received RABs while operating in the second state. This suspension of response to RAB is represented by "X" above each of RABs #15-24 that are received by the AT while it is operating in the second state. Correspondingly, the adjustment trend during the AT's operation in the second state remains unchanged. That is, from RAB #15 through RAB #24, the AT's reverse-link data transmission rate remains at a level in place when the AT transitioned from operating in the first state to operating in the second state; i.e., the at the level corresponding to RAB #14 in the present example.

Advantageously, the AT does not consume battery power in alternating reverse-link transmission power while operating in the second state. Although this advantage is gained by purposefully not responding to the sector's RAB broadcasts, the condition that the RABs are alternating in value indicates that the RNR in the sector is relatively stable with respect to the threshold RNR. Therefore, suspending responding to RAB broadcasts will not likely result in significantly higher RNR in the sector. Moreover, not all active ATs in the sector will transition to the second; rather only those that have low battery power will do so. Finally, in further accordance with the example embodiment, the AT will transition back to operating in the first state if and when it receives a second threshold number of RABs that have the same value. This will indicate that the sector is no longer measuring RNR that alternates above and below the RNR threshold.

The transition back to the first state is illustrated, again by way of example, in FIG. 5 with RABs #23 and #24, which both have values of zero (modulated to −1). In the present example, the second threshold number is taken to be two. Thus, the occurrence of two consecutive RABs with the same value triggers the transition back to operation the first state 504b, represented by dashed rectangle open toward the right (indicating that this state may persist beyond the last RAB #31). The AT begins responding to RABs again once it is operating in the first state, as indicated by the adjustment trends corresponding to RABs #25-31. It will be appreciated that the value of consecutive RABs #23 and #24 is taken to be zero by way of example; both could have a value of one and still satisfy the condition of two consecutive RABs with the same value. In addition, the second threshold number of two is also an example; other values could be used as well.

It may also be noted that the response of ATs with active EVDO session in a sector whose RNR is ping-ponging can tend to contribute to conditions that cause the ping-ponging. That is, since each access terminal with an active EVDO session in the sector will respond conventionally by tending to increase and decrease its reverse-link data transmission power levels in alternating fashion, the aggregate effect of all such ATs can be to cause conditions that lead to ping-ponging to persist. Accordingly, in addition to helping to mitigate or eliminate undue battery consumption, adaptive rate control based on battery life can provide the additional benefit of advantageously reducing or eliminating at least some of the causes of ping-ponging of RNR in a sector.

In further accordance with the example embodiment, the threshold battery power level applied in adaptive rate control based on battery life can be specified as an absolute level, such as a voltage, or as fractional or percentage level relative to full battery power. For example, the threshold could be specified as 1.25 Volts, or as 25% of full power. Other values could be used as well. Additionally, the threshold battery level could be configured as a parameter setting of the AT, or could be specified in a message from the RAN to the AT.

4. Implementation of Example Embodiment

As described above, the example embodiment involves actions and operations carried out by an access terminal. The example embodiment can therefore be implemented as executable steps and operations of a method carried out by an access terminal. Implementation of the example embodiment can further be considered as including means for carrying out the method. An example implementation of means in an access terminal is described below. By way of example, the access terminal is taken to be configured to operate according to IS-856 in a similarly-compliant wireless communication system, such as the one described above in connection with FIG. 3. More specifically, the access terminal is assumed to be configured to support at least IS-856, Rel. 0, and could support IS-856, Rev. A, as well.

a. Example Method Implementation

Figure 6:
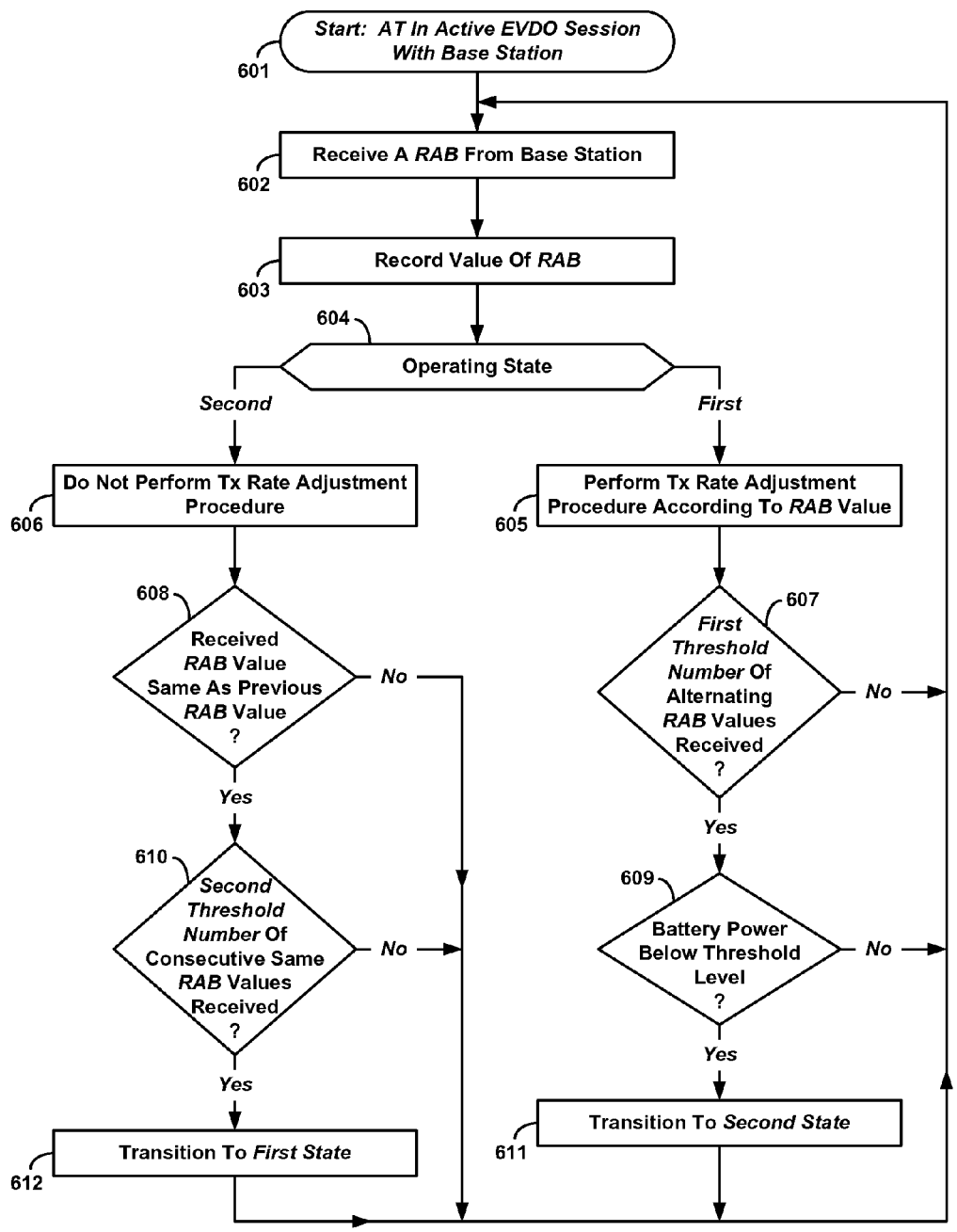
FIG. 6 illustrates an example embodiment of logical steps for implementing adaptive rate control based on battery life in an access terminal.

FIG. 6 is a logical flowchart representing executable steps and operations that could be carried out by an access terminal to implement an example method of adaptive rate control based on battery life. The illustrated steps could be implemented in an AT (or similar device) as executable instructions stored in the memory of the AT and executed by one or more processors of the AT. The executable instructions could also be stored on some form of non-transitory tangible computer readable storage medium, such as magnetic or optical disk, or the like, and provided for transfer to the AT's memory during manufacture, configuration, or other step(s) for preparing the AT for operation.

At the start 601, the AT is engaged in an active EVDO communication session via a BTS (or base station). As such, the access terminal is carrying out reverse power-control procedures according to one or another of IS-856, Rel. 0 and IS-856, Rev. A. At step 602, the AT receives a RAB from the sector (referenced as a "base station" in the figure). As described above, the RAB has one of two binary values (typically zero or one) depending on whether the sector measures RNR below or above a threshold value.

The AT records the value of the RAB at step 603. For instance, the AT stores the value in its memory. By recording the RAB value, the AT can track consecutive values, either like or opposite, in order to determine the conditions for state transitions.

At step 604, the AT determines in which state it is currently operating. If the AT is operating in the first state ("First" branch from step 604), the AT performs an adjustment to its reverse-link transmission rate at step 605. For instance, if the AT is operating according to Rel. 0 of IS-856, the AT will perform the probability test, and modify its rate based on the RAB value if the test yields success.

The AT will then proceed from step 605 to step 607, where it determines if the first threshold number of alternating RAB values has been received. If not ("No" branch from step 607), the AT will return to step 602 to await receipt of the next RAB.

If the first threshold number has been received ("Yes" branch from step 607), then one of the conditions for transitioning to the second state has been met, and the AT proceeds to step 609 to determine if the second condition has also been met, namely if the AT's battery power level is below the threshold level. It the battery power is not below the threshold level ("No" branch from step 607), the AT will return to step 602 to await receipt of the next RAB.

If the battery power is below the threshold level ("Yes" branch from step 607), then both of the conditions for transitioning to the second state has been met, and the AT proceeds to step 611 where it transitions to operating in the second state. The AT then returns to step 602 to await receipt of the next RAB.

If at step 604 the AT is operating in the second state ("Second" branch from step 604), the AT does not perform an adjustment to its reverse-link transmission rate, as indicated at step 606. Again assuming the AT is operating according to Rel. 0 of IS-856, the AT will not perform the probability test, and thus will not modify its current reverse-link data transmission rate. Note that step 606 implies an absence of an action; i.e., not performing an adjustment to reverse-link transmission rate. As such, this step could be omitted from the present illustrative figure; it is included explicitly in order to call attention to the particular behavior of the AT when operating in the second state.

The AT then proceeds from step 606 to step 608 where it determines if the RAB value just received is the same as the value of the immediately preceding received RAB. If not ("No" branch from step 608), then the RAB values are still alternating. In this case, the AT will return to step 602 to await receipt of the next RAB.

If the RAB value just received is the same as the value of immediately preceding received RAB ("Yes" branch from step 608), then at least the two consecutive the RABs with the same value have been received. In this case, the AT proceeds to step 610, where it determines if the second threshold number of consecutive RABs with the same value have been received. If they have not ("No" branch from step 610), the AT will return to step 602 to await receipt of the next RAB.

If at step 610 the second threshold number of consecutive RABs with the same value have been received ("Yes" branch from step 610), then the condition for transitioning back to the first state has been met. In this case, the AT proceeds to step 612 where it transitions back to operating in the first state. The AT then returns to step 602 to await receipt of the next RAB.

The steps above remain in operation for the duration of the EVDO session. The example embodiment can be easily adapted to account for RABs from more than one active sector. Specifically, an AT with more than one sector in its active set will receive RABs from each active sector during an active EVDO session. In this case, a RAB value of one for any one of the active sectors will be treated by the AT as a value of one for the purposes of adjusting its reverse-link data transmission rate, even if one or more of the other active sectors broadcast a RAB of zero. Thus, in tallying consecutive RABs of either the same or opposite values, the AT will take the value to be one if any one sector broadcasts a RAB value of one, and will take the value to be zero only if all the active sectors broadcast a value of zero.

It will be appreciated that the steps shown in FIG. 6 are meant to illustrate operation of example embodiments. As such, various steps could be altered or modified, the ordering of certain steps could be changed, and additional steps could be added, while still achieving the overall desired operation.

b. Example Access Terminal

Figure 7:
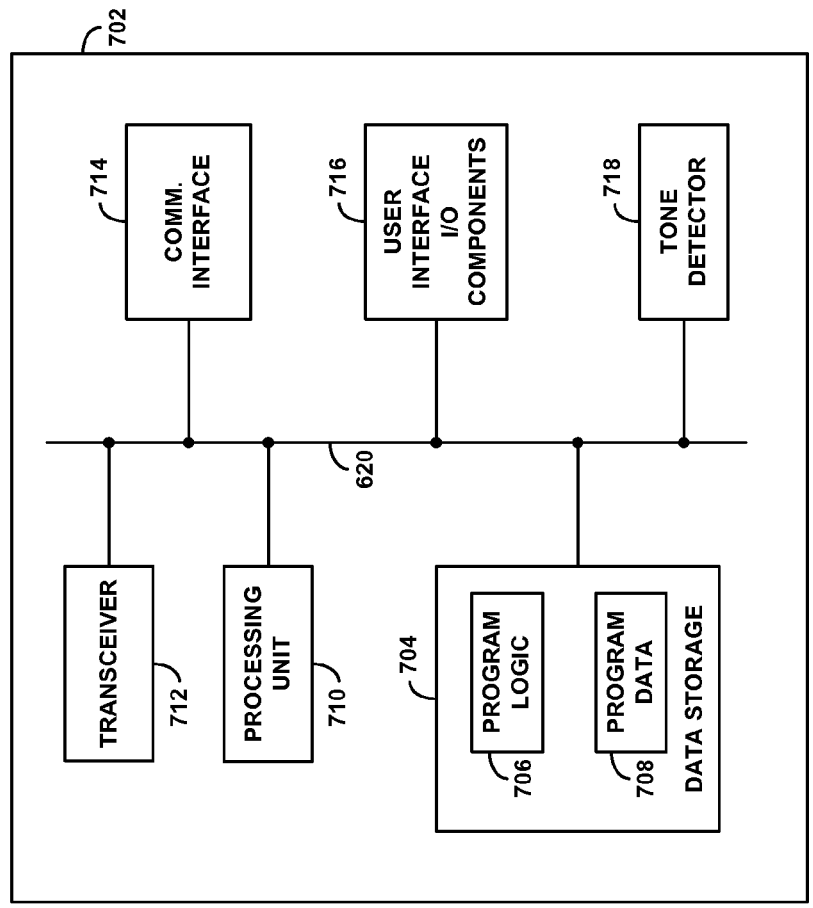
FIG. 7 is a block diagram of an example access terminal in which adaptive rate control based on battery life may be implemented.

FIG. 7 is a simplified block diagram depicting functional components of an example access terminal 702 in which operation of adaptive rate control based on battery life may be implemented. The example AT 702 could be a cell phone, a personal digital assistant (PDA), a pager, a wired or wirelessly-equipped notebook computer, or any other sort of device. As shown in FIG. 7, the example AT 702 includes data storage 704, processing unit 710, transceiver 712, communication interface 714, user-interface I/O components 716, and tone detector 718, all of which may be coupled together by a system bus 720 or other mechanism.

These components may be arranged to support conventional operation in a wireless communication network that is compliant with a CDMA family of protocols, such as network 300 illustrated in FIG. 3. The details of such an arrangement and how these components function to provide conventional operation are well-known in the art, and are not described further herein. Certain aspects of AT 702 relevant to adaptive rate control based on battery life are discussed briefly below.

Communication interface 714 in combination with transceiver 712, which may include one or more antennas, enables communication with the network, including reception of reverse-noise messages (e.g., RAB broadcasts) from the serving base station and transmission of both the primary and auxiliary pilots, as well as support for other forward and reverse link channels. The communication interface may include a module, such as an MSM™-series chipset made by Qualcomm Inc. of San Diego, Calif., and supports wireless packet-data communications according to a CDMA family of protocols.

Processing unit 710 comprises one or more general-purpose processors (e.g., INTEL microprocessors) and/or one or more special-purpose processors (e.g., dedicated digital signal processor, application specific integrated circuit, etc.). In turn, the data storage 704 comprises one or more volatile and/or non-volatile storage components, such as magnetic or optical memory or disk storage. Data storage 704 can be integrated in whole or in part with processing unit 710, as cache memory or registers for instance. In example AT 702, as shown, data storage 704 is configured to hold both program logic 706 and program data 708.

Program logic 706 may comprise machine language instructions that define routines executable by processing unit 710 to carry out various functions described herein. In particular the program logic, communication interface, and transceiver may operate cooperatively to carry out logical operation such as that discussed above and illustrated in FIG. 6. Further, program data 708 may be arranged to store local thresholds and ranges for comparing numbers of consecutive RAB values, as well as for tallying consecutive RAB values, as described above.

It will be appreciated that there can be numerous specific implementations of an access terminal, such as AT 702, in which the method of adaptive rate control based on battery life could be implemented. Further, one of skill in the art would understand how to devise and build such an implementation. As such, AT 702 is representative of means for carrying out the method of adaptive rate control based on battery life, in accordance with the methods and steps described herein by way of example.

5. Conclusion

An exemplary embodiment of the present invention has been described above. Those skilled in the art will understand, however, that changes and modifications may be made to this embodiment without departing from the true scope and spirit of the invention, which is defined by the claims.

What is claimed:

1. In an access terminal operating in a wireless communication system that includes a base station, a method comprising:
    operating in a first state in which at least: the access terminal responds to receiving reverse-noise messages from the base station by making adjustments to a data transmission rate on a reverse-link traffic channel to the base station in accordance with the received reverse-noise messages, wherein each of the reverse-noise messages comprises an indicator of reverse-link noise measured relative to a threshold level by the base station;
    while operating in the first state, receiving a first threshold number of reverse-noise messages from the base station indicating that the reverse-link noise measured by the base station is alternating above and below the threshold level; and
    in response to both of (i) the access terminal having a battery power level below a threshold power level, and (ii) receiving the first threshold number of reverse-noise messages, transitioning to operating in a second state in which at least: the access terminal does not make the adjustments to the data transmission rate on the reverse-link traffic channel in response to receiving reverse-noise messages from the base station.

2. The method of claim 1, wherein the access terminal is configured to operate according to a CDMA family of protocols including at least IS-856, Rel. 0,
    wherein the base station comprises a BTS and a coverage area, the coverage area being at least one of a cell and a sector,
    wherein the reverse-noise messages each comprise a reverse activity bit (RAB) for the coverage area, each RAB having one of two binary values,
    and wherein making the adjustments to the data transmission rate on a reverse-link traffic channel to the base station in accordance with the received reverse-noise messages comprises adjusting the data transmission rate on the reverse-link traffic channel in response to each received RAB in accordance with procedures defined by IS-856.

3. The method of claim 2, wherein receiving the first threshold number of reverse-noise messages from the base station indicating that the reverse-link noise measured by the base station is alternating above and below the threshold level comprises receiving a number of consecutive RABs that alternate in value between the two binary values, wherein the number equals the first threshold number.

4. The method of claim 3, wherein not making the adjustments to the data transmission rate on the reverse-link traffic channel in response to receiving reverse-noise messages from the base station comprises suspending the procedures defined by IS-856 for adjusting the data transmission rate on the reverse-link traffic channel for each received RAB.

5. The method of claim 1, wherein the access terminal having the battery power level below the threshold power level comprises:
    making a determination that the battery power level is below the threshold power level, wherein the determination is made at a time selected from a group consisting of (i) prior to the access terminal operating in the first state, and (ii) while the access terminal is operating in the first state.

6. The method of claim 1, wherein the data transmission rate is at a current rate when the access terminal transitions to operating in the second state,
    and wherein not making the adjustments to the data transmission rate on the reverse-link traffic channel in response to receiving reverse-noise messages from the base station comprises maintaining the data transmission rate at the current rate regardless of reverse-noise messages received from the base station.

7. The method of claim 1, further comprising:
    while operating in the second state, receiving a second threshold number of reverse-noise messages from the base station indicating that the reverse-link noise measured by the base station is no longer alternating above and below the threshold level, and responsively transitioning to operating in the state.

8. An access terminal configured to operate in a wireless communication system that includes a base station, the access terminal comprising:
    means for operating in a first state in which at least: the access terminal responds to receiving reverse-noise messages from the base station by making adjustments to a data transmission rate on a reverse-link traffic channel to the base station in accordance with the received reverse-noise messages, wherein each of the reverse-noise messages comprises an indicator of reverse-link noise measured relative to a threshold level by the base station;
    means for operating in a second state in which at least: the access terminal does not make the adjustments to the data transmission rate on the reverse-link traffic channel in response to receiving reverse-noise messages from the base station; and
    means for transitioning from operating in the first state to operating in the second state in response to both of (i) having a battery power level below a threshold power level, and (ii) receiving a first threshold number of reverse-noise messages from the base station indicating that the reverse-link noise measured by the base station is alternating above and below the threshold level.

9. The access terminal of claim 8, wherein the access terminal is further configured to operate according to a CDMA family of protocols including at least IS-856, Rel. 0,
wherein the base station comprises a BTS and a coverage area, the coverage area being at least one of a cell and a sector,
wherein the reverse-noise messages each comprise a reverse activity bit (RAB) for the coverage area, each RAB having one of two binary values,
and wherein making the adjustments to the data transmission rate on a reverse-link traffic channel to the base station in accordance with the received reverse-noise messages comprises adjusting the data transmission rate on the reverse-link traffic channel in response to each received RAB in accordance with procedures defined by IS-856.

10. The access terminal of claim 9, wherein receiving the first threshold number of reverse-noise messages from the base station indicating that the reverse-link noise measured by the base station is alternating above and below the threshold level comprises receiving a number of consecutive RABs that alternate in value between the two binary values, wherein the number equals the first threshold number.

11. The access terminal of claim 10, wherein not making the adjustments to the data transmission rate on the reverse-link traffic channel in response to receiving reverse-noise messages from the base station comprises suspending the procedures defined by IS-856 for adjusting the data transmission rate on the reverse-link traffic channel for each received RAB.

12. The access terminal of claim 8, wherein having a battery power level below the threshold power level comprises:
making a determination that the battery power level is below the threshold power level, wherein the determination is made at a time selected a group consisting of (i) prior to the access terminal operating in the first state, and (ii) while the access terminal is operating in the first state.

13. The access terminal of claim 8, wherein the data transmission rate is at a current rate when the access terminal transitions to operating in the second state,
and wherein not making the adjustments to the data transmission rate on the reverse-link traffic channel in response to receiving reverse-noise messages from the base station comprises maintaining the data transmission rate at the current rate regardless of reverse-noise messages received from the base station.

14. The access terminal of claim 8, further comprising:
means for transitioning from operating in the second state to operating in the first state in response to receiving a second threshold number of reverse-noise messages from the base station indicating that the reverse-link noise measured by the base station is no longer alternating above and below the threshold level.

15. A non-transitory tangible computer readable storage medium having stored thereon computer-executable instructions that, if executed by an access terminal, cause the access terminal to perform functions comprising:
operating in a first state in which at least: the access terminal responds to receiving reverse-noise messages from a base station by making adjustments to a data transmission rate on a reverse-link traffic channel to the base station in accordance with the received reverse-noise messages, wherein each of the reverse-noise messages comprises an indicator of reverse-link noise measured relative to a threshold level by the base station;
while operating in the first state, receiving a first threshold number of reverse-noise messages from the base station indicating that the reverse-link noise measured by the base station is alternating above and below the threshold level; and
in response to both of (i) the access terminal having a battery power level below a threshold power level, and (ii) receiving the first threshold number of reverse-noise messages, transitioning to operating in a second state in which at least: the access terminal does not make the adjustments to the data transmission rate on the reverse-link traffic channel in response to receiving reverse-noise messages from the base station.

16. The non-transitory tangible computer readable storage medium of claim 15, wherein the access terminal is configured to operate according to a CDMA family of protocols including at least IS-856, Rel. 0,
wherein the base station comprises a BTS and a coverage area, the coverage area being at least one of a cell and a sector,
wherein the reverse-noise messages each comprise a reverse activity bit (RAB) for the coverage area, each RAB having one of two binary values,
and wherein making the adjustments to the data transmission rate on a reverse-link traffic channel to the base station in accordance with the received reverse-noise messages comprises adjusting the data transmission rate on the reverse-link traffic channel in response to each received RAB in accordance with procedures defined by IS-856.

17. The non-transitory tangible computer readable storage medium of claim 16, wherein receiving the first threshold number of reverse-noise messages from the base station indicating that the reverse-link noise measured by the base station is alternating above and below the threshold level comprises receiving a number of consecutive RABs that alternate in value between the two binary values, wherein the number equals the first threshold number.

18. The non-transitory tangible computer readable storage medium of claim 17, wherein not making the adjustments to the data transmission rate on the reverse-link traffic channel in response to receiving reverse-noise messages from the base station comprises suspending the procedures defined by IS-856 for adjusting the data transmission rate on the reverse-link traffic channel for each received RAB.

19. The non-transitory tangible computer readable storage medium of claim 15, wherein the access terminal having the battery power level below the threshold power level comprises:
making a determination that the battery power level is below the threshold power level, wherein the determination is made at a time selected from a group consisting of (i) prior to the access terminal operating in the first state, and (ii) while the access terminal is operating in the first state.

20. The non-transitory tangible computer readable storage medium of claim 15, wherein the data transmission rate is at a current rate when the access terminal transitions to operating in the second state,
and wherein not making the adjustments to the data transmission rate on the reverse-link traffic channel in response to receiving reverse-noise messages from the base station comprises maintaining the data transmission rate at the current rate regardless of reverse-noise messages received from the base station.

21. The non-transitory tangible computer readable storage medium of claim 15, wherein the functions further comprise:

while operating in the second state, receiving a second threshold number of reverse-noise messages from the base station indicating that the reverse-link noise measured by the base station is no longer alternating above and below the threshold level, and responsively transitioning to operating in the state.

\* \* \* \* \*